US 008825794B2

(12) United States Patent
Kim et al.

(10) Patent No.: US 8,825,794 B2
(45) Date of Patent: Sep. 2, 2014

(54) APPARATUS AND METHOD FOR TRANSMITTING AND RECEIVING MULTICAST BROADCAST SERVICE (75) Inventors: Eunkyung Kim, Seoul (KR); Soojung Jung, Daejeon (KR); Jae Sun Cha, Daejeon (KR); Sung Cheol Chang, Daejeon (KR); Hyun Lee, Daejeon (KR); Chul Sik Yoon, Seoul (KR)

(73) Assignee: Electronics and Telecommunications Research Institute, Daejeon (KR)

(*) Notice: Subject to any disclaimer, the term of this patent is extended or adjusted under 35 U.S.C. 154(b) by 293 days.

(21) Appl. No.: 13/198,124

(22) Filed: Aug. 4, 2011

(65) Prior Publication Data
US 2012/0036222 A1 Feb. 9, 2012

(30) Foreign Application Priority Data
Aug. 5, 2010 (KR) .................. 10-2010-0075466
Aug. 3, 2011 (KR) .................. 10-2011-0077518

(51) Int. Cl.
G06F 15/16 (2006.01)
H04L 12/18 (2006.01)

(52) U.S. Cl.
CPC .................. *H04L 12/189* (2013.01); *H04L 12/18* (2013.01)
USPC ........................................ 709/217

(58) Field of Classification Search
USPC .................. 709/217, 219, 227, 230, 231
See application file for complete search history.

(56) References Cited

U.S. PATENT DOCUMENTS

| | | | | |
|---|---|---|---|---|
| 8,654,697 B2* | 2/2014 | Wu et al. | ........ | 370/312 |
| 2007/0133565 A1* | 6/2007 | Hyun et al. | ........ | 370/395.52 |
| 2007/0192594 A1* | 8/2007 | Lee et al. | ........ | 713/163 |
| 2007/0280296 A1* | 12/2007 | Suzuki et al. | ........ | 370/485 |
| 2008/0008176 A1* | 1/2008 | Lim et al. | ........ | 370/390 |
| 2008/0056219 A1* | 3/2008 | Venkatachalam | ........ | 370/342 |
| 2008/0089264 A1* | 4/2008 | Kim et al. | ........ | 370/312 |
| 2008/0198797 A1* | 8/2008 | Park et al. | ........ | 370/328 |
| 2008/0212529 A1* | 9/2008 | Kim et al. | ........ | 370/329 |
| 2008/0247372 A1* | 10/2008 | Chion et al. | ........ | 370/338 |
| 2008/0267104 A1* | 10/2008 | Zhang | ........ | 370/311 |
| 2009/0034459 A1* | 2/2009 | Shousterman et al. | ........ | 370/329 |
| 2009/0190518 A1* | 7/2009 | Kim et al. | ........ | 370/312 |
| 2009/0207773 A1* | 8/2009 | Feng et al. | ........ | 370/312 |
| 2009/0323576 A1* | 12/2009 | Jung | ........ | 370/312 |
| 2010/0027455 A1* | 2/2010 | Wang | ........ | 370/312 |
| 2010/0061288 A1* | 3/2010 | Yun et al. | ........ | 370/312 |
| 2011/0145387 A1* | 6/2011 | Peng et al. | ........ | 709/223 |

FOREIGN PATENT DOCUMENTS

| | | | | |
|---|---|---|---|---|
| CN | 101742409 A | * | 6/2010 | |
| KR | 20080038805 A | * | 5/2008 | |
| KR | 20080073553 A | * | 8/2008 | |
| KR | 20100117386 A | * | 11/2010 | |
| WO | WO 2009016619 A2 | * | 2/2009 | |
| WO | WO 2010051462 A1 | * | 5/2010 | |
| WO | WO 2010074424 A2 | * | 7/2010 | |

* cited by examiner

*Primary Examiner* — Kostas Katsikis
(74) *Attorney, Agent, or Firm* — Staas & Halsey LLP (57) ABSTRACT

A multicast broadcast service (MBS) receiving device establishes an MBS connection with an MBS transmitting device through a connection establishment message. When it is determined to receive MBS right after establishing the MBS connection, the MBS receiving device starts to receive the MBS right after establishing the MBS connection. When it is determined to not receive MBS right after establishing the MBS connection, the MBS receiving device transmits an MBS report message to the MBS transmitting device and then starts to receive the MBS.

20 Claims, 5 Drawing Sheets

APPARATUS AND METHOD FOR TRANSMITTING AND RECEIVING MULTICAST BROADCAST SERVICE

CROSS-REFERENCE TO RELATED APPLICATION

This application claims priority to and the benefit of Korean Patent Application No. 10-2010-0075466 filed in the Korean Intellectual Property Office on Aug. 5, 2010, and 10-2011-0077518 filed in the Korean Intellectual Property Office on Aug. 3, 2011, the entire contents of which are incorporated herein by reference.

BACKGROUND OF THE INVENTION (a) Field of the Invention

The present invention relates to an apparatus for transmitting and receiving a multicast broadcast service (MBS). Particularly, the present invention relates to a method for an MBS transmitting device to transmit an MBS to an MBS receiving device and a method for an MBS receiving device to receive MBS from an MBS transmitting device.

(b) Description of the Related Art

An MBS transmitting device and an MBS receiving device establish an MBS connection with dynamic service related messages (referred as "DSx messages"). The DSx messages include a dynamic service addition request message (DSA-REQ), a dynamic service addition response message (DSA-RSP), a dynamic service change request message (DSC-REQ), a dynamic service change response message (DSC-RSP), a dynamic service deletion request message (DSD-REQ), a dynamic service deletion response message (DSD-RSP), and so on.

However, after establishing the MBS connection, a method to determine when the MBS transmitting device starts to receive MBS has not been provided, and thereby it may be difficult to bill for an MBS.

SUMMARY OF THE INVENTION

The present invention has been made in an effort to provide a method having advantages that a multicast broadcast service (MBS) transmitting device easily recognizes a time when an MBS receiving device starts to receive MBS.

An exemplary embodiment of the present invention provides a method for a multicast broadcast service (MBS) transmitting device to transmit MBS to an MBS receiving device. The method includes: establishing an MBS connection with the MBS receiving device through a connection establishment message; determining a time right after establishing the MBS connection as an MBS reception start time when the MBS receiving device receives MBS right after establishing the MBS connection; and determining a time after an MBS report message is received as an MBS reception start time when the MBS receiving device does not receive MBS right after establishing the MBS connection and the MBS transmitting device receives the MBS report message from the MBS receiving device.

The method may further include performing capability exchange with the MBS receiving device using a registration request message and a registration response message, wherein an MBS connection is established with the MBS receiving device through the connection establishment message after the capability exchange.

The connection establishment message may include information on whether the MBS receiving device receives an MBS after establishing the MBS.

The method may further include, if a timer has expired when the MBS receiving device does not receive the MBS after establishing the MBS, determining a time when the timer expires as the MBS reception start time of the MBS receiving device.

The connection establishment message may include an action code, wherein the action codes represents whether the MBS receiving device starts to receive MBS after establishing the MBS connection, after the timer has expired after establishing the MBS connection, or after when the MBS receiving device informs the MBS transmitting device of starting to receive MBS after establishing the MBS connection.

When the action codes represent that the MBS receiving device starts to receive MBS after establishing the MBS connection, the connection establishment message may include a value of the timer.

Another embodiment of the present invention provides a method for a multicast broadcast service (MBS) receiving device to receive MBS from an MBS transmitting device. The method includes: establishing an MBS connection with the MBS transmitting device through a connection establishment message; starting to receive MBS right after establishing the MBS connection when it is predetermined that the MBS receiving device receives an MBS right after establishing the MBS connection; transmitting an MBS report message to the MBS transmitting device when it is predetermined that the MBS receiving device does not receive MBS right after establishing the MBS connection; and starting to receive MBS after transmitting the MBS report message.

The method may further include performing capability exchange with the MBS transmitting device using a registration request message and a registration response message, wherein an MBS connection is established with the MBS transmitting device through the connection establishment message after the capability exchange.

Yet another embodiment of the present invention provides a method for a multicast broadcast service (MBS) transmitting device to transmit an MBS to an MBS receiving device. The method includes: establishing an MBS connection with the MBS receiving device through a connection establishment message; determining a time right after establishing the MBS connection as an MBS reception start time of an MBS receiving device when the MBS receiving device receives the MBS right after establishing the MBS connection; and determining an MBS reception start time, when the MBS receiving device does not receive the MBS right after establishing the MBS connection and the MBS transmitting device transmits the MBS reception start time to the MBS receiving device, as an MBS reception start time of an MBS receiving device.

The method may further include performing capability exchange with the MBS receiving device using a registration request message and a registration response message, wherein an MBS connection is established with the MBS receiving device through the connection establishment message after the capability exchange.

Yet another embodiment of the present invention provides a method for a multicast broadcast service (MBS) receiving device to receive MBS from an MBS transmitting device. The method includes: establishing an MBS connection with the MBS transmitting device through a connection establishment message; starting to receive MBS right after establishing the MBS connection when it is predetermined that the MBS receiving device receives an MBS right after establishing the MBS connection; receiving an MBS reception start time from the MBS transmitting device when it is predetermined that the MBS receiving device does not receive MBS right after establishing the MBS connection; and starting to receive MBS at the MBS reception start time.

The method may further include performing capability exchange with the MBS transmitting device using a registration request message and a registration response message, wherein an MBS connection may be established with the MBS transmitting device through the connection establishment message after the capability exchange.

Yet another embodiment of the present invention provides a method for a multicast broadcast service (MBS) transmitting device to transmit an MBS to an MBS receiving device. The method includes: establishing an MBS connection with the MBS receiving device through a connection establishment message; determining a time right after establishing the MBS connection as an MBS reception start time when the MBS receiving device receives MBS right after establishing the MBS connection; and determining an MBS reception start time included in the MBS connection establishment message as an MBS reception start time of the MBS receiving device when the MBS receiving device does not receive MBS right after establishing the MBS connection.

The connection establishment message may include information on whether the MBS receiving device receives MBS after establishing the MBS, wherein, when the information represents that the MBS receiving device does not receive MBS right after establishing the MBS connection, the connection establishment further includes at least one of a value of a timer for representing the MBS reception start time, a frame number, a frame offset, and low-order bits of the frame number.

Yet another embodiment of the present invention provides a method for a multicast broadcast service (MBS) receiving device to receive MBS from an MBS transmitting device. The method includes: establishing an MBS connection with the MBS transmitting device through a connection establishment message; starting to receive MBS right after establishing the MBS connection when it is predetermined that the MBS receiving device receives MBS right after establishing the MBS connection; and starting to receive at an MBS reception start time included in the MBS connection establishment message when the MBS receiving device does not receive MBS right after establishing the MBS connection.

The connection establishment message may include information on whether the MBS receiving device receives MBS after the establishing the MBS, wherein, when the information represents that the MBS receiving device does not receive MBS right after the establishing the MBS connection, the connection establishment further includes at least one of a value of a timer for representing the MBS reception start time, a frame number, a frame offset, and low-order bits of the frame number.

In the embodiments of the present invention, the MBS transmitting device may correspond to a base station or a relaying station, and the MBS receiving device may correspond to a mobile station.

DETAILED DESCRIPTION OF THE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. Through the specification, in addition, unless explicitly described to the contrary, the word "comprise" and variations such as "comprises" or "comprising" will be understood to imply the inclusion of stated elements but not the exclusion of any other elements.

In this specification, a mobile station (MS) may refer to a terminal, a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment. In this specification, a base station (BS) may refer to an access point (AP), a radio access station (RAS), a node B, a base transceiver station (BTS), or an MMR (mobile multihop relay)-BS. The base station may include all or part of the functions of the access point, the radio access station, the node B, the base transceiver station, and the MMR-BS.

Methods for receiving a multicast broadcast service (MBS) according to exemplary embodiments of the present invention will be described with reference to FIG. 1 to FIG. 3.

Figure 1:
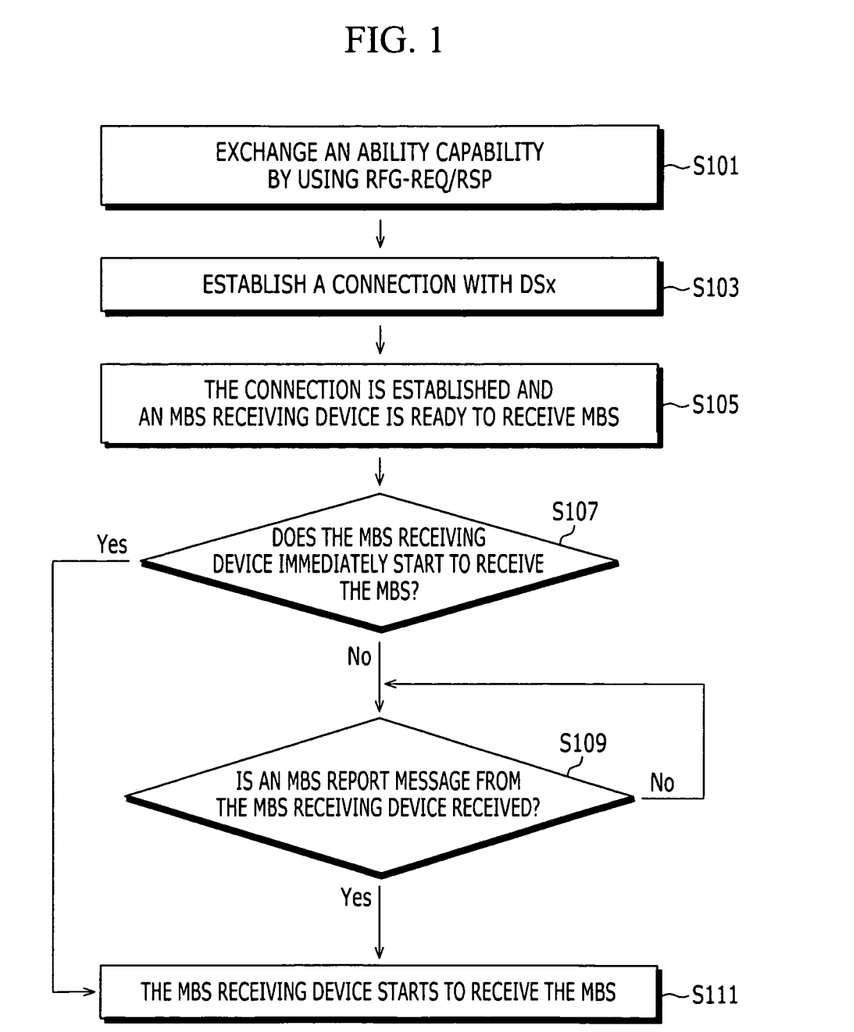
FIG. 1 shows a flowchart of a method for receiving MBS according to an exemplary embodiment of the present invention.

FIG. 1 shows a flowchart of a method for receiving MBS according to an exemplary embodiment of the present invention.

An MBS transmitting device and MBS receiving device perform capability exchange using a registration request message (REG-REQ) and a registration response message (REG-RSP) (S101).

An MBS connection is established between the MBS transmitting device and the MBS receiving device with dynamic service related message (DSx message) based on the exchanged capability (S103).

After the MBS connection is established, the MBS receiving device is ready to receive MBS (S105).

If it is set to immediately receive MBS (S107), the MBS receiving device starts to receive MBS through the established MBS connection right after the MBS connection is established (S111).

If it is not set to immediately receive MBS (S107), the MBS receiving device transmits an MBS report message (MBS-REP) to the MBS transmitting device in order to inform of MBS reception start (S109) and then starts to receive MBS through the MBS connection (S111).

Figure 2:
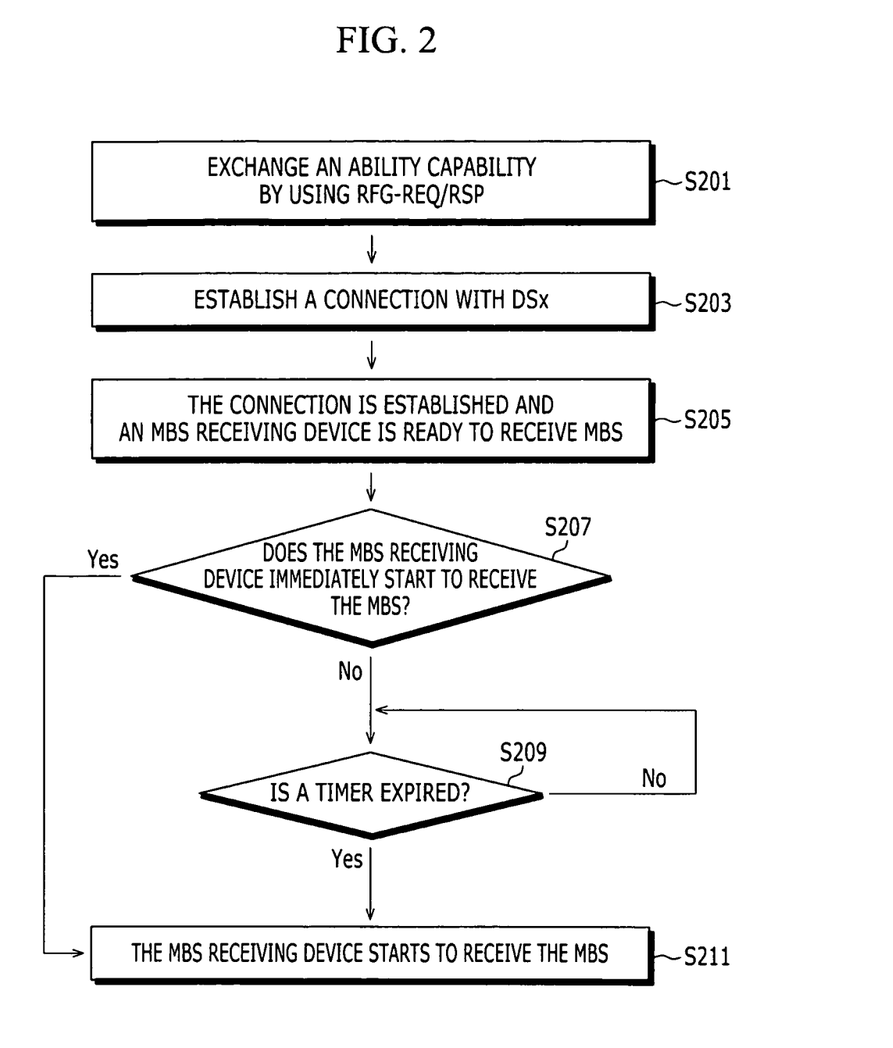
FIG. 2 shows a flowchart of a method for receiving MBS according to another exemplary embodiment of the present invention.

FIG. 2 shows a flowchart of a method for receiving an MBS according to another exemplary embodiment of the present invention.

An MBS transmitting device and an MBS receiving device perform capability exchange using a registration request message (REG-REQ) and a registration response message (REG-RSP) (S201).

An MBS connection is established between the MBS transmitting device and the MBS receiving device with dynamic service related message (DSx message) based on the exchanged capability (S203).

After the MBS connection is established, the MBS receiving device is ready to receive MBS (S205).

If it is set to immediately receive MBS (S207), the MBS receiving device starts to receive MBS through the MBS connection right after the MBS connection is established (S211).

If it is not set to immediately receive MBS (S207), the MBS receiving device determines whether a timer has expired (S209). When the timer has expired, the MBS receiving device starts to receive MBS through the established MBS connection (S211). After the MBS connection is established with the dynamic service related message (DSx message), the MBS transmitting device may inform the MBS receiving device of a value of the timer, a frame number corresponding to a frame at which the MBS starts, a frame offset, low-order bits (LSBs) of the frame number, and other through messages.

Figure 3:
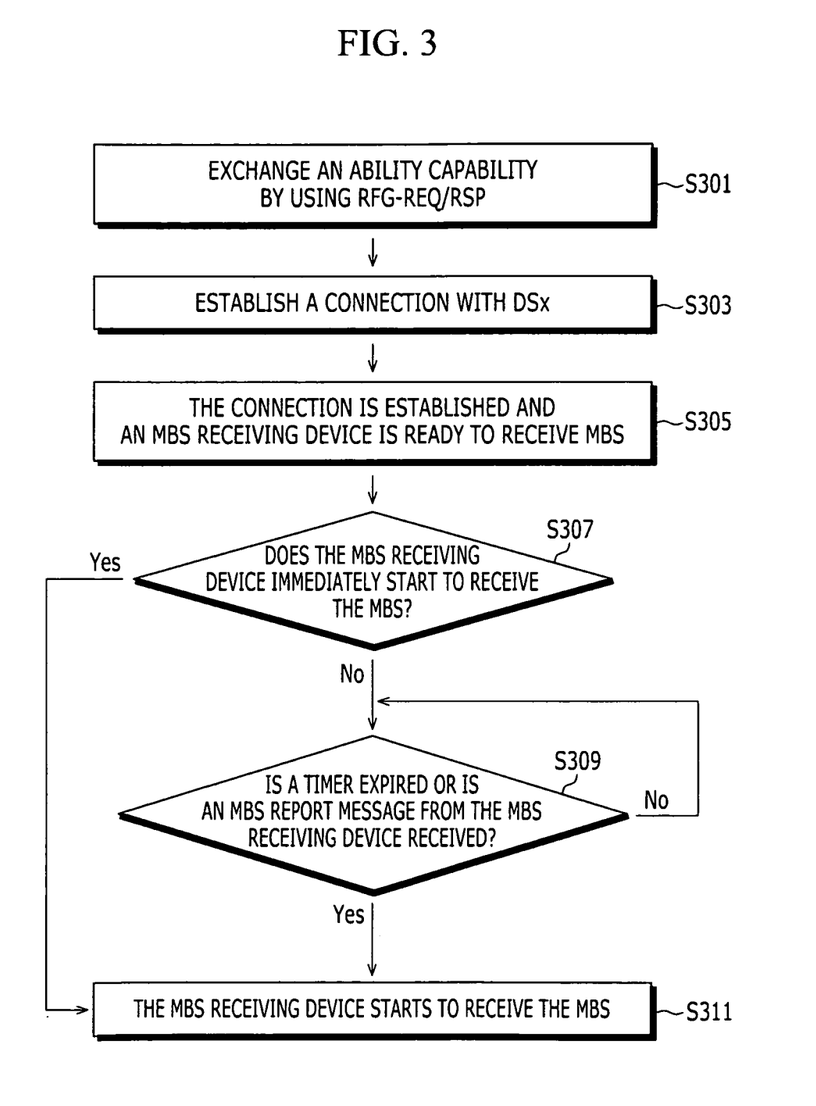
FIG. 3 shows a flowchart of a method for receiving MBS according to yet another exemplary embodiment of the present invention.

FIG. 3 shows a flowchart of a method for receiving an MBS according to yet another exemplary embodiment of the present invention.

An MBS transmitting device and an MBS receiving device perform capability exchange using a registration request message (REG-REQ) and a registration response message (REG-RSP) (S301).

An MBS connection is established between the MBS transmitting device and the MBS receiving device with dynamic service related message based on the exchanged capability (S303).

After the MBS connection is established, the MBS receiving device is ready to receive MBS (S305).

If it is set to immediately receive MBS (S307), the MBS receiving device starts to receive MBS through the established MBS connection right after the MBS connection is established (S311).

If it is not set to immediately receive MBS (S307), when a timer has expired or after the MBS receiving device transmits an MBS report message to the MBS transmitting device, the MBS receiving device starts to receive MBS through the established MBS connection (S311).

Next, a method for transmitting MBS and a method for receiving an MBS according to an exemplary embodiment of the present invention will be specifically described with reference to FIG. 4.

Figure 4:
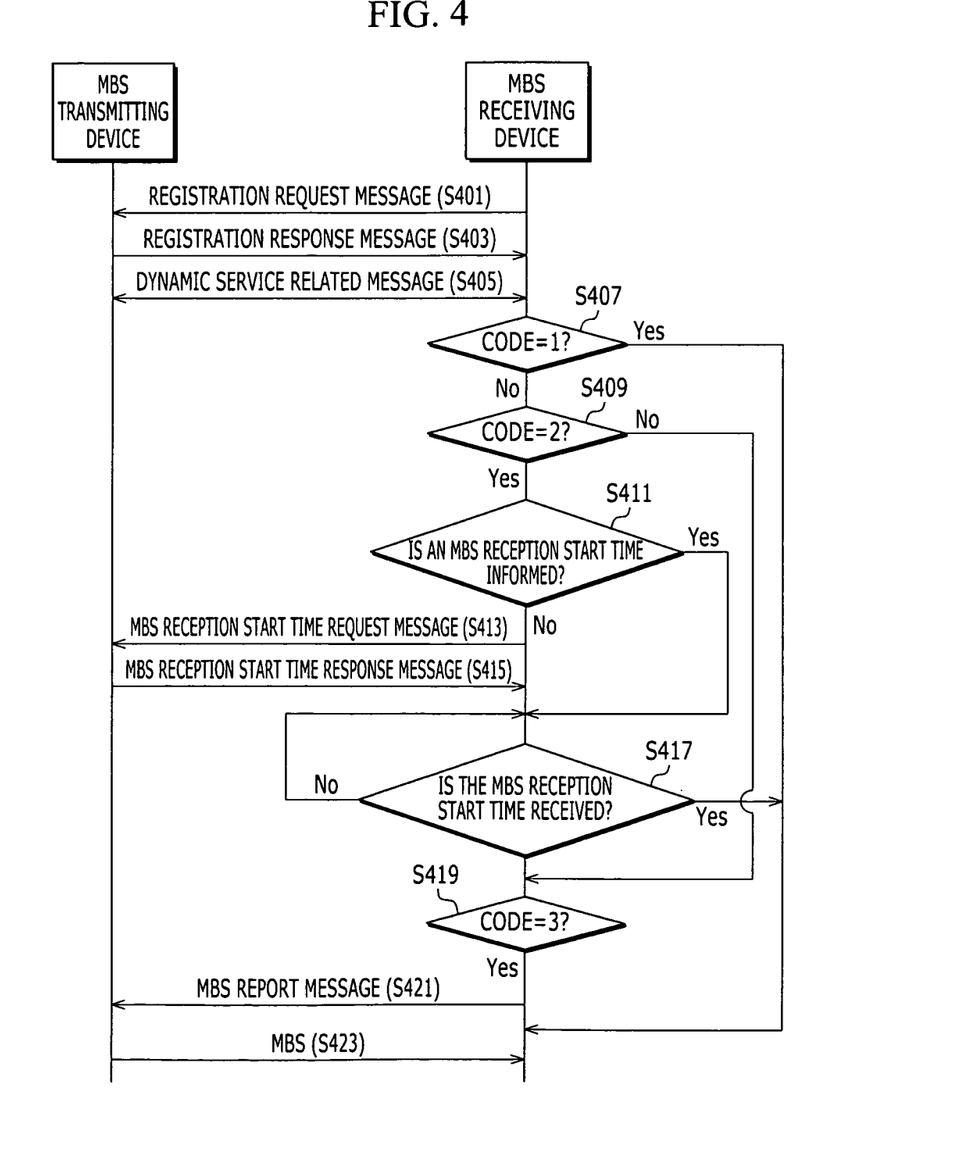
FIG. 4 shows a ladder diagram of a method for transmitting MBS and a method for receiving MBS according to an exemplary embodiment of the present invention.

FIG. 4 shows a ladder diagram of a method for transmitting MBS and a method for receiving an MBS according to an exemplary embodiment of the present invention.

First, an MBS receiving device reports its capability and transmits a registration request message for requesting registration to an MBS transmitting device (S401).

The MBS transmitting device transmits a registration response message in response to the registration request message (S403).

After the capability exchange with the registration request message and the registration response message, the MBS transmitting device and the MBS receiving device establishes an MBS connection with dynamic service related message (DSx message) (S405). The dynamic service related message includes a dynamic service addition request message (DSA-REQ), a dynamic service addition response message (DSA-RSP), a dynamic service change request message (DSC-REQ), a dynamic service change response message (DSC-RSP), a dynamic service deletion request message (DSD-REQ), a dynamic service deletion response message (DSD-RSP), and so on.

The dynamic service addition request message and the dynamic service addition response message include an MBS parameter for establishing the MBS connection. The MBS parameter includes an MBS identifier, a flow identifier (FID), an MBS zone identifier (MBS Zone ID), MBS carrier information like a physical carrier index, and others. The MBS transmitting device or the MBS receiving device may transmit a dynamic service addition request message to request the MBS connection. A dynamic service addition response message is generated and transmitted in response to the dynamic service addition request message.

The MBS transmitting device or MBS receiving device may transmit a dynamic service change request message in order to request to change a parameter of the established MBS connection. The dynamic service change response message is generated and transmitted in response to the dynamic service change request message.

The MBS transmitting device or MBS receiving device may transmit a dynamic service deletion request message in order to request to delete the established MBS connection. The dynamic service deletion response message is generated and transmitted in response to the dynamic service deletion request message.

The dynamic service related message that is transmitted to the MBS receiving device by the MBS transmitting device includes one of action codes that are shown in Table. 1 or includes a combination of the action codes.

TABLE 1

| Action code number | Context |
| --- | --- |
| 1 | An MBS receiving device starts to receive MBS right after a dynamic service addition (DSA) procedure. |
| 2 | An MBS receiving device starts to receive MBS when a predetermined time has passed after a DSA procedure. |
| 3 | An MBS receiving device informs an MBS transmitting device of an MBS reception start after a DSA procedure and starts to receive MBS. |

When dynamic service related message that is transmitted to an MBS receiving device by the MBS transmitting device includes an action code corresponding to the action code number 2, the dynamic service related message may inform the MBS receiving device of the time when the reception of the MBS starts, that is, MBS reception start time. The time of the MBS reception start is informed through an additional message.

After the MBS connection is established, the MBS receiving device determines the action code of the dynamic service related message received from the MBS transmitting device.

When the action code corresponds to an action code number 1 (S407), the MBS transmitting device determines the time right after the DSA procedure as the MBS reception start time and the MBS receiving device starts to receive MBS right after the DSA procedure (S423).

When the action code corresponds to an action code number 2 (S409), if the MBS reception start time is informed to the MBS receiving device, the MBS receiving device starts to receive MBS at the MBS reception start time (S423). Meanwhile, if the MBS reception start time is not informed to the MBS receiving device (S411), the MBS receiving device transmits a message for requesting the MBS reception start time to the MBS transmitting device (S413) and the MBS transmitting device transmits a response message including the MBS reception start time to the MBS receiving device (S415). Then the MBS transmitting device determines the MBS reception start time as the time when the MBS receiving device starts to receive MBS and the MBS receiving device starts to receive MBS at the MBS reception start time (S423).

When the action code corresponds to an action code number 3 (S419), the MBS receiving device informs the MBS transmitting device of the MBS reception start time through a location update message or an MBS report message S421, and the MBS transmitting device determines the time when the MBS reception start time is informed as the time when the MBS receiving device starts to receive MBS and the MBS receiving device starts to receive MBS at the MBS reception start time (S423). The MBS report message includes a report on the MBS reception start time, a report on the change of the MBS reception, a report on the termination of the MBS reception, an MBS zone identifier, and an identifier of MBS contents that are being received, are scheduled to be received, or are to be terminated. The MBS receiving device may periodically transmit the MBS report message to report information on the MBS contents that is being received or is desired to be received.

Next, referring to FIG. 5, an MBS transmitting device and an MBS receiving device according to an exemplary embodiment of the present invention will be described.

Figure 5:
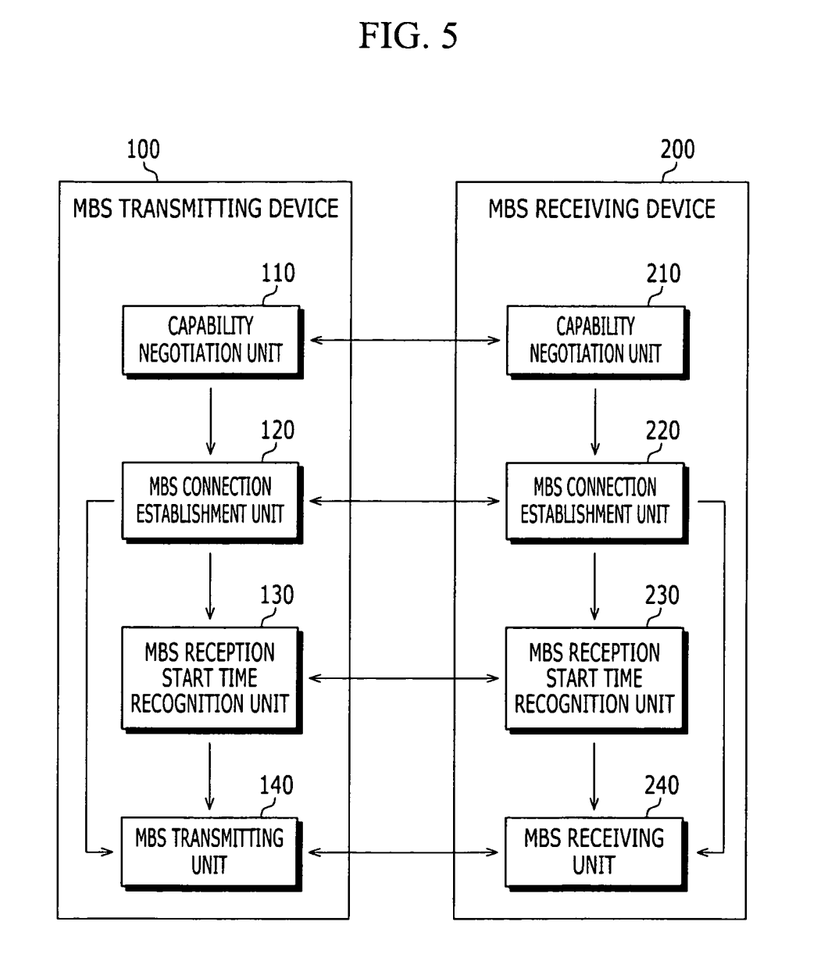
FIG. 5 shows a block diagram of an MBS transmitting device and an MBS receiving device according to an exemplary embodiment of the present invention.

FIG. 5 shows a block diagram of an MBS transmitting device and an MBS receiving device according to an exemplary embodiment of the present invention.

As shown in FIG. 5, an MBS transmitting device 100 according to an exemplary embodiment of the present invention includes a capability negotiation unit 110, an MBS connection establishment unit 120, an MBS reception start time recognition unit 130, and an MBS transmitting unit 140. The MBS receiving device 200 according to an exemplary embodiment of the present invention includes a capability negotiation unit 210, an MBS connection establishment unit 220, an MBS reception start time recognition unit 230, and an MBS receiving unit 240.

The capability negotiation units 110 and 210 perform capability exchange using a registration request message (REG-REQ) and a registration response message (REG-RSP).

The MBS connection establishment units 120 and 220 establish an MBS connection with dynamic service related message (DSx message) based on the exchanged capability.

The MBS reception start time recognition units 130 and 230 determine, at least one of the time right after the MBS connection is established, the MBS reception start time included in the dynamic service related message, the MBS reception start time included in an MBS reception start time response message, expiration time of a timer, the time when an MBS report message is transmitted/received, and others, as the MBS reception start time of the MBS receiving device 200, as described above.

The MBS transmitting unit 140 transmits an MBS to the MBS receiving unit 240.

According to exemplary embodiments of present invention, the MBS transmitting device may be a base station or a relay station, and the MBS receiving device may be a mobile station.

In addition, the MBS transmitting device can easily know the point in time when the MBS receiving device starts to receive MBS, and thereby it is possible to exactly bill for the providing of the MBS.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a multicast broadcast service (MBS) transmitting device to transmit MBS to an MBS receiving device, the method comprising:
   establishing an MBS connection with the MBS receiving device through a connection establishment message;
   determining, using the connection establishment message, whether the MBS receiving device is set to immediately receive an MBS upon establishing the MBS connection; and
   determining an MBS reception start time based on whether the MBS receiving device is set to immediately receive an MBS upon establishing the MBS connection;
   wherein the MBS reception start time is a time following the establishment of the MBS connection if the MBS receiving device is set to immediately receive an MBS upon establishing the MBS connection; and
   wherein the MBS reception start time is a time following a receipt of an MBS report message if the MBS receiving device is not set to immediately receive an MBS upon establishing the MBS connection.

2. The method of claim 1, further comprising
   performing capability exchange with the MBS receiving device using a registration request message and a registration response message,
   wherein the MBS connection is established with the MBS receiving device through the connection establishment message after the capability exchange, and
   wherein the connection establishment message is a dynamic service related message which includes message types DSA-REQ (dynamic service addition request), DSA-RSP (dynamic service addition response), DSC-REQ (dynamic service change request), DSC-RSP (dynamic service change response), DSD-REQ (dynamic service deletion request), and DSD-RSP (dynamic service deletion response).

3. The method of claim 2, wherein the connection establishment message includes information on whether the MBS receiving device receives MBS without delay after establishing the MBS connection.

4. The method of claim 2, further comprising,
   if the MBS receiving device is not set to immediately receive an MBS upon establishing the MBS connection and a timer has expired, the MBS reception start time is a time when the timer expires.

5. The method of claim 4, wherein the connection establishment message includes an action code,
   wherein the action code represents whether the MBS receiving device starts to receive MBS without delay after establishing the MBS connection, after the timer has expired after establishing the MBS connection, or after the MBS receiving device informs the MBS transmitting device of starting to receive MBS after establishing the MBS connection.

6. The method of claim 5, wherein when the action code represents that the MBS receiving device starts to receive MBS after the timer has expired, the connection establishment message includes a value of the timer.

7. A method for a multicast broadcast service (MBS) receiving device to receive MBS from an MBS transmitting device, the method comprising:
establishing an MBS connection with the MBS transmitting device through a connection establishment message;
determining, using the connection establishment message, whether the MBS receiving device is set to receive an MBS without delay after establishing the MBS connection;
starting to receive MBS right after establishing the MBS connection when it is determined that the MBS receiving device is set to receive an MBS without delay after establishing the MBS connection;
transmitting an MBS report message to the MBS transmitting device when it is determined that the MBS receiving device is not set to receive an MBS without delay after establishing the MBS connection; and
starting to receive MBS after transmitting the MBS report message.

8. The method of claim 7, further comprising
performing capability exchange with the MBS transmitting device using a registration request message and a registration response message,
wherein an MBS connection is established with the MBS transmitting device through the connection establishment message after the capability exchange, and
wherein the connection establishment message is a dynamic service related message which includes message types DSA-REQ (dynamic service addition request), DSA-RSP (dynamic service addition response), DSC-REQ (dynamic service change request), DSC-RSP (dynamic service change response), DSD-REQ (dynamic service deletion request), and DSD-RSP (dynamic service deletion response).

9. The method of claim 8, wherein the connection establishment message includes information on whether the MBS receiving device receives an MBS without delay after establishing the MBS.

10. A method for a multicast broadcast service (MBS) transmitting device to transmit MBS to an MBS receiving device, the method comprises:
establishing an MBS connection with the MBS receiving device through a connection establishment message;
determining, using the connection establishment message, whether the MBS receiving device is set to immediately receive an MBS upon establishing the MBS connection;
determining an MBS reception start time of the MBS receiving device based on whether the MBS receiving device is set to immediately receive an MBS upon establishing the MBS connection;
wherein the MBS reception start time of the MBS receiving device is a time following the establishment of the MBS connection if the MBS receiving device is set to immediately receive an MBS upon establishing the MBS connection; and
wherein the MBS reception start time of the MBS receiving device is a time following a receipt of an MBS report message if the MBS receiving device is not set to immediately receive an MBS upon establishing the MBS connection.

11. The method of claim 10, further comprising
performing capability exchange with the MBS receiving device using a registration request message and a registration response message,
wherein an MBS connection is established with the MBS receiving device through the connection establishment message after the capability exchange, and
wherein the connection establishment message is a dynamic service related message which includes message types DSA-REQ (dynamic service addition request), DSA-RSP (dynamic service addition response), DSC-REQ (dynamic service change request), DSC-RSP (dynamic service change response), DSD-REQ (dynamic service deletion request), and DSD-RSP (dynamic service deletion response).

12. The method of claim 11, wherein the connection establishment message includes information on whether the MBS receiving device receives an MBS without delay after establishing the MBS connection.

13. A method for a multicast broadcast service (MBS) receiving device to receive MBS from an MBS transmitting device, the method comprising:
establishing an MBS connection with the MBS transmitting device through a connection establishment message;
determining, using the connection establishment message, whether the MBS receiving device is set to immediately receive an MBS upon establishing the MBS connection;
starting to receive MBS right after establishing the MBS connection when it is determined that the MBS receiving device is set to immediately receive an MBS upon establishing the MBS connection;
receiving an MBS reception start time from the MBS transmitting device when it is determined that the MBS receiving device is not set to immediately receive an MBS upon establishing the MBS connection; and
starting to receive MBS at the MBS reception start time.

14. The method of claim 13, further comprising:
performing capability exchange with the MBS transmitting device using a registration request message and a registration response message,
wherein the an MBS connection is established with the MBS transmitting device through the connection establishment message after the capability exchange, and
wherein the connection establishment message is a dynamic service related message which includes message types DSA-REQ (dynamic service addition request), DSA-RSP (dynamic service addition response), DSC-REQ (dynamic service change request), DSC-RSP (dynamic service change response), DSD-REQ (dynamic service deletion request), and DSD-RSP (dynamic service deletion response).

15. The method of claim 14, wherein the connection establishment message includes information on whether the MBS receiving device receives an MBS without delay after establishing the MBS connection.

16. A method for a multicast broadcast service (MBS) transmitting device to transmit an MBS to an MBS receiving device, the method comprising:
establishing an MBS connection with the MBS receiving device through an MBS connection establishment message;

determining, using the connection establishment message, whether the MBS receiving device is set to immediately receive an MBS upon establishing the MBS connection;

determining an MBS reception start time;

wherein the MBS reception start time is after the MBS connection is established if the MBS receiving device is set to immediately receive an MBS upon establishing the MBS connection; and wherein the MBS reception start time is included in the MBS connection establishment message if the MBS receiving device is not set to immediately receive an MBS upon establishing the MBS connection.

17. The method of claim 16, wherein the connection establishment message includes information on whether the MBS receiving device receives MBS after establishing the MBS, wherein, when the information represents that the MBS receiving device is not set to receive MBS immediately after establishing the MBS connection, the connection establishment further includes at least one of a value of a timer for representing the MBS reception start time, a frame number, a frame offset, and low-order bits of the frame number.

18. A method for a multicast broadcast service (MBS) receiving device to receive MBS from an MBS transmitting device, the method comprising:

establishing an MBS connection with the MBS transmitting device through a connection establishment message;

determining, using the connection establishment message, whether the MBS receiving device is set to immediately receive an MBS upon establishing the MBS connection;

starting to receive MBS after establishing the MBS connection if the MBS receiving device is set to immediately receive an MBS upon establishing the MBS connection; and starting to receive at an MBS reception start time included in the MBS connection establishment message if the MBS receiving device is not set to immediately receive an MBS upon establishing the MBS connection.

19. The method of claim 18, wherein the connection establishment message includes information on whether the MBS receiving device receives an MBS after establishing the MBS, wherein, when the information represents that the MBS receiving device is not set to receive MBS immediately after establishing the MBS connection, the connection establishment further includes at least one of a value of a timer for representing the MBS reception start time, a frame number, a frame offset, and low-order bits of the frame number.

20. The method of claim 18, wherein the MBS transmitting device corresponds to a base station or a relaying station, and the MBS receiving device corresponds to a mobile station.

* * * * *